D. LA COUR AND C. V. SCHOU.
PRODUCTION OF HEAT AND ITS APPLICATION FOR HEATING LIQUIDS AND OTHER PURPOSES.
APPLICATION FILED SEPT. 30, 1915.
1,417,075. Patented May 23, 1922.
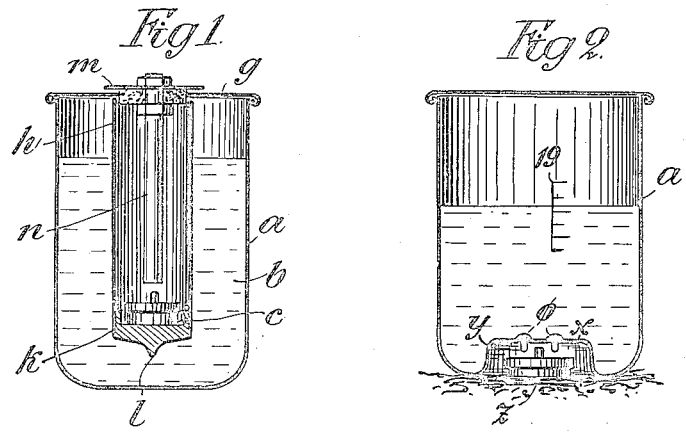
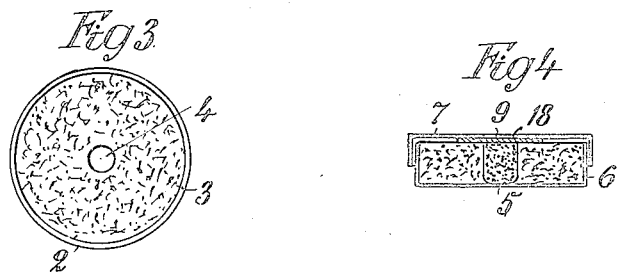
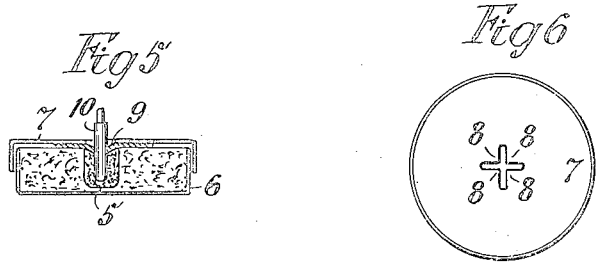
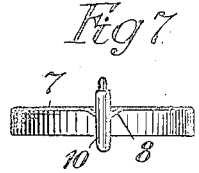

UNITED STATES PATENT OFFICE.

DAN LA COUR, OF CHARLOTTENLUND, NEAR COPENHAGEN, AND CECIL VILHELM SCHOU, OF COPENHAGEN, DENMARK.

PRODUCTION OF HEAT AND ITS APPLICATION FOR HEATING LIQUIDS AND OTHER PURPOSES.

1,417,075.

Specification of Letters Patent.   Patented May 23, 1922.

Application filed September 30, 1915.  Serial No. 53,474.

*To all whom it may concern:*

Be it known that we, DAN LA COUR and CECIL VILHELM SCHOU, subjects of the King of Denmark, and residing at Charlottenlund, near Copenhagen, Denmark, and Copenhagen, Denmark, respectively, have invented a new and useful Improvement in and Connected with the Production of Heat and its Application for Heating Liquids and Other Purposes.

And we do hereby declare the following to be a full, clear and exact description of the same.

This invention relates to improvements in and connected with the production of heat and its application for heating liquids by means of the reaction heat generated by certain chemical processes and has for its object an especially appropriate form of heating cartridge and a heating container adapted for use therewith.

As heat developing material for such a cartridge is advantageously used the well known mixture of an easily oxidizable metal such as aluminum or magnesium and a metal oxide such as iron oxide which is able to generate a considerable amount of heat without forming gaseous combustion products. It is a well known fact that such mixtures of aluminium and metal oxides are difficult to bring to reaction and can only be ignited by means of igniting means which contain combustible substances mixed with material readily liberating oxygen such as perchlorate of potassium or peroxide of barium. A cartridge which contains such substances is, however, dangerous, being too liable to be ignited accidentally.

According to the present invention the cartridge is prepared in such a manner that it contains an ignition substance which is not easily ignitable per se as it does not contain substances which easily give off oxygen but which are, however, able to be ignited at the temperature generated through the combustion of the substances of which the heads of safety matches are generally made. It is hereby secured that such a cartridge can be made ready immediately before its use by insertion of a match or fusee while the cartridge and the chlorate of potassium containing ignition means are kept separately before use. Other features of the present invention will appear from the following application.

The invention will be described with reference to the accompanying drawings which illustrate several embodiments thereof.

Figures 1 and 2 show sections through various forms of vessel adapted to be employed for heating liquids and provided with heating cartridges according to the invention.

Figure 3 is a plan of one form of fuel cartridge with the cover removed.

Figure 4 is a transverse section of same with the lid applied on the same.

Figure 5 is a similar view showing the ignition match applied.

Fig. 6 is a plan of a modified form of cartridge lid.

Figure 7 is a transverse section of same showing the ignition match inserted therethrough.

The apparatus shown in Figure 1 consists of a container $a$ of circular or oval shape adapted to receive the water or liquid $b$ to be heated.

The lid $g$ is formed with a downwardly extending cylinder $h$ open at top, which may be formed of tinned iron plate, and this is provided at its lower end with a short cylindrical box having a heavy bottom $k$ preferably of copper. This is preferably of the section shown being at the bottom of more or less conical shape and having a central deflecting point $l$ which is in touch with a considerable quantity of water, and owing to its shape assists a lively flow of the water under the same. This is essential to the duration of the apparatus, as a heavy formation of steam with stagnant steam bubbles causes so great a heating of the bottom that the contact between the metal wall and the circulating water is interrupted and the so-called Leidenfrost's phenomenon takes place, which further reduces the transmission of heat so that the bottom becomes incandescent. This, which easily occurs when a flat bottom is used, does not occur with the shape of bottom shown even if the water in the container $a$ boils intensely, the rapid circulation of the water under the bottom $k$ preventing so intense a heating of its lower surface that its continuous moistening by water is prevented. The cylinder $h$ is provided with a cover $m$ which carries a tube $n$, through which a lighted match or fuse can be thrown down which will strike the centre of the cartridge $c$ resting on the bottom $k$.

The apparatus shown gives a very high efficiency the entire process and the transmission of the heat to the contents of the vessel being ended in the course of a few minutes, during which time the loss of heat to the surroundings is but insignificant.

The container $a$ shown in Figure 2 is formed with a raised portion in the middle of its bottom $x$ forming a cavity $y$ under the same which can accommodate a fuel cartridge $z$. The cartridge is in this case placed directly on the ground, and the efficiency may be considerably augmented if the bottom is provided with a number of studs $o$, of copper, which subsequently to melting of the cartridge are pressed down into contact with it by a simple pressure of the hand on the top of the container $a$ which is thereby pressed down into the sand or ground on which it is resting.

As heat producing means is used a cartridge preferably containing a mixture of powdered aluminium and one or other form of iron oxide. The iron oxide produced by roasting pyrites has been found specially suitable particularly when it has been subjected to chlorination roasting and treatment with water for the extraction of copper and has been thoroughly dried. The presence of sulphur is to be avoided, not that it interferes with the reaction but may give rise to offensive odours owing to the action of moisture in the atmosphere.

The mixture of aluminium powder and iron oxide preferably contains approximately equivalent weights of the two constituents, the equivalent weight of iron oxide if anything being slightly greater than that of the aluminium. The mixture is brought into a case or capsule of sheet metal and is compressed into cakes or blocks of the desired size in a suitable press.

One form of fuel cartridge is shown in Figure 3 of the drawings. In this form 2 indicates the cartridge case or capsule, 3 the compressed mixture and 4 a cavity therein adapted to receive a suitable ignition device. This latter is necessary as it is difficult to ignite, that is to say start the reaction, in the mixture. A suitable method of ignition is to insert in the space 4 some material which on ignition developes sufficient heat and a high enough temperature to ignite the cartridge. Various materials may be used for this purpose, but we prefer to employ a mixture of powdered magnesium and oxide of copper which is not easily inflammable per se but more easily ignitible than the main substance of the cartridge. As this mixture burns so quickly and is apt to detonate on ignition we prefer to mix with it some other substance or substances to reduce the speed of combustion and so ensure that the main cartridge is properly ignited. For this purpose we have found that if some of the fuel mixture, that is, the aluminium-iron oxide mixture, is mixed with the magnesium and oxide of copper an ignition mixture is found which answers the purpose excellently.

Figure 4 is a transverse section through a complete cartridge. The lower portion 6 of the case or capsule is filled by the compressed cake or block of aluminium powder and iron oxide and in the central cavity is placed the ignition powder 5. Over the top of these is placed a piece of strong paper and over this again is placed the lid 7 having a central opening 18. Such a cartridge can be kept for any length of time and is perfectly safe to handle.

When the cartridge is to be used the paper cover 9 is pierced through the opening 18 in the lid and the head 10 of a fusee is inserted into the cartridge in the manner shown in Figure 5. The cartridge is then ignited by setting fire to the end of the fusee projecting out of the cartridge. When such a cartridge is for instance employed in the apparatus shown in Figure 1, and a lighted fusee is thrown down through the tube $n$ this effects the ignition of the head 10 of the fusee inserted in the cartridge, and thereby the combustion of the cartridge is started.

Although the head of the fusee 10 generally is sufficiently secured by the paper 9, the lid 7 may, if desired, be punched in the manner shown in Figure 6 or in a manner similar thereto, so that points 8 are formed which are somewhat bent down on the insertion of the match-head 10, as shown in Figure 7, and firmly secure same.

Having now particularly described and ascertained the nature of the said invention what we claim and desire to secure by Letters Patent of U. S. America is:

1. A heating cartridge comprising a capsule, an aluminum and iron oxide combustible mixture therein, an igniting mixture comprising magnesium and copper oxide disposed within a cavity in said combustible mixture, and adapted to receive a fusee.

2. A heating cartridge comprising a capsule, a non-carbon combustible mixture contained therein, an igniting mixture comprising magnesium and a stable oxide of a heavy metal and not readily inflammable per se, said igniting mixture being disposed within a cavity in said combustible mixture.

3. A heating cartridge comprising a capsule, a non-carbon combustible mixture contained therein, an igniting mixture comprising magnesium and a stable oxide of a heavy metal and a small proportion of the main heat supplying mixture, said igniting mixture being disposed within a cavity in said combustible mixture and adapted to receive a fusee.

4. A heating cartridge including a capsule, an aluminum and iron oxide combustible mixture therein, an igniting mixture comprising magnesium and copper oxide and a small proportion of the aluminum-iron oxide fuel mixture disposed within a cavity in said combustible mixture and adapted to receive a fusee.

In testimony whereof we affix our signatures in presence of two witnesses.

DAN LA COUR.
CECIL VILHELM SCHOU.

Witnesses:
F. PETERSEN,
E. FREDERIKSEN.